United States Patent [19]

Hale

[11] Patent Number: 4,696,374

[45] Date of Patent: Sep. 29, 1987

[54] ATV HUNTING STAND

[76] Inventor: John E. Hale, 5423 Maple St., North Little Rock, Ark. 72118

[21] Appl. No.: 925,616

[22] Filed: Oct. 31, 1986

[51] Int. Cl.⁴ .............................................. A01M 31/02
[52] U.S. Cl. ...................................... 182/127; 182/20; 182/129; 182/187
[58] Field of Search .................. 182/127, 115, 116, 63, 182/187, 152, 129, 20; 297/16

[56] References Cited

U.S. PATENT DOCUMENTS

| | | | |
|---|---|---|---|
| 1,960,588 | 5/1934 | Jorgensen | 182/127 |
| 3,220,766 | 11/1965 | Kates | 182/116 |
| 3,490,558 | 1/1970 | Foley | 182/127 |
| 3,863,736 | 2/1975 | McWilliams | 182/187 |
| 3,882,964 | 5/1975 | Schellenberg | 182/127 |
| 4,113,055 | 9/1978 | Cleockler | 182/127 |
| 4,228,870 | 10/1980 | Beardsley | 182/127 |
| 4,614,252 | 9/1986 | Tarner | 182/187 |
| 4,625,831 | 12/1986 | Rodgers, Jr. | 182/187 |

Primary Examiner—Reinaldo P. Machado
Attorney, Agent, or Firm—Stephen D. Carver

[57] ABSTRACT

A portable hunting stand which is adapted to be retrofitted to a three wheeled motorcycle, ATV or the like for permanent operative association therewith may be deployed by a hunter or the like in a low profile ATV-transportable position, a cage position providing an enclosure, or a hunting position for seating the hunter in a secure elevated position above the terrain. A plurality of upwardly extending, rigid support stanchions operatively disposed generally at the vertices of the standard ATV rectangular deck support a chair support plate coupled to the stanchions. An associated foldable footrest may be deployed to provide a firm footing and to brace the elevated chair upon which the hunter may sit. A front stabilizer leg associated with the front of the chair provides a stabilizing connection to the chair support plate. Side and rear plate structure provides for conversion of the stand into an enclosure suitable in the cage position, for at least temporarily housing a hunting dog or the like or for storing or transporting game. The foot shelf is foldably coupled to the front stanchions and it may be deployed in either a horizontal orientation providing a foot support, or it may be folded vertically upwardly rearwardly into contact with the front stanchions to help provide an enclosure. A pair of rear support pedestals extend downwardly from the rear stanchions and terminate in suitable support plates which contact the ground to support the rear of the ATV to insure that the hunter, or other person seated within the elevated chair is securely braced.

8 Claims, 8 Drawing Figures

ATV HUNTING STAND

BACKGROUND OF THE INVENTION

The present invention relates generally to all terrain vehicles (i.e. hereinafter referred to ATV's) of the type popularly known as "three wheelers," "four wheelers" and the like. More particularly, the present invention relates to a hunting stand kit adapted to be retro-fitted to conventional ATV's for use in hunting.

As will be readily be appreciated by those familiar with the art, hunting stands provide a number of advantages to the hunter. For example, the skilled hunter who must wait for relatively long periods of time until a suitable game animal approaches will find it desirable to assume a comfortalbe position where his view of the surrounding area is relatively unobstructed, and where his relative safety is assured. It is particularly advantageous for the observer to elevate himself well above the ground so that he may have unobstructed command of a sufficient area of woods.

It is known that portable, easily installed tree stands may possibly facilitate greater user freedom, require less financial sacrifice, and waste less hunting time. If properly assembled and correctly situated, a portable tree stand can provide the user with a clear view of a broad area, enhancing the hunter's chances of success. However, it is imperative that a suitable tree stand or seat be safe, comfortable, easily deployed, and easily accessed. Accordingly, the prior art suggests a wide variety of tree stand devices, which devices employ a variety of different structural elements for securing the stand upon a desired tree and a number of devices for safe and convenient user access.

Southard, U.S. Pat. No. 3,871,482, Gray, U.S. Pat. No. 3,817,350, and Eastridge, U.S. Pat. No. 4,475,627 all depict general tree stand devices. Meyer, U.S. Pat. No. 4,458,782 and Shinkle, U.S. Pat. No. 4,474,265, provide support for the user's legs and equipment. Other basic tree stand inventions are also illustrated in U.S. Pats. Nos. 4,124,094 and 3,961,686 and U.S. Pat. No. Des. 270,474. Other references include Starkey, U.S. Pat. No. 3,961,686, Campbell, U.S. Pat. No. 4,061,202, and Stavenau, U.S. Pat. No. 4,134,474.

However, none of the prior art known to me discloses a hunting stand which is adapted to be retro-fitted to a three wheeled motorcycle, ATV or the like for permanent operative association therewith. Most prior art tree stands known to me are rather inefficient and difficult to operate. Once installed, at a not insignificant sacrifice in time and energy, the hunters mobility is sacrificed. Even if a suitable hunting stand stand is lightweight and easily transportable, the time investment in erecting and removing such a stand from a tree is often prohibitive and vexatious.

Hunters who prefer to use ATV's for transportation through the hunting woods would be most benefitted by a hunting stand which is rigidly and operatively associated with an ATV for transportation thereby.

SUMMARY OF THE INVENTION

The present invention comprises a portable hunter stand assembly adapted to be operably associated with a conventional ATV. Once properly installed upon the ATV, the unit may be deployed in a "low profile" orientation for good non-obstructing vertical clearance, and once the hunter arrives at the intended hunting site the unit may quickly be operationally deployed to provide an elevated, readily movable hunting stand. When the hunter returns to camp or arrives back from a hunt, the unit may thereafter be unfolded and disassembled and folded into a convenient generally flat position or orientation for subsequent transportation or storage.

The preferred ATV stand may be operationally deployed in either an operable hunting observation position, or it may be deployed in an intermediate "ATV moving" position wherein it assumes relatively increased vertical clearance. Optional plate structure is provied for converting the basic unit into an enclosure suitable for at least temporarily housing a hunting dog or the like. Alternatively it may be removed from the ATV and manually folded into a non-operative totally transportable, substantially folded and planar position convenient for storage or the like.

The preferred ATV comprises a generally rectangular rear deck mechanically associated with the rear carriage portion of the ATV, which in most cases is permanently secured by suitable bolts, welding or the like. Importantly, the rear deck provides a preferred base upon which the structure of the stand may thereafter be secured.

The sides of the rear deck mount a plurality of upwardly extending, rigid support stanchions disposed generally at the vertices of the rectangular deck. Preferably a generally planar, chair support plate, is coupled to the stanchions in spaced-apart, generally parallel relationship relative to the lower ATV rear deck. An associated foldable footrest may be deployed to provide a firm footing and to brace the elevated chair upon which the hunter may sit. A front stabilizer leg associated with the front of the chair provides a stabilizing connection to the chair support plate.

The foot shelf is foldably coupled to the front stanchions and it may be deployed in either a horizontal orientation providing a foot support, or it may be folded vertically upwardly rearwardly into contact with the front stanchions to help provide an enclosure. The enclosure mode also necessitates the deployment of a pair of optional side plates coupled to the stanchions on opposite sides of the stand. Similarly a rear plate is associated with the rear stanchions across the back of the stand. An animal such as a hunting dog may be confined within the enclosure so defined.

In operation the apparatus may be moved about relative to the ATV and stored separately, where required, and disposed in the transportable position. A pair of rear support pedestals extend downwardly from the rear stanchions and terminate in suitable support plates which contact the ground to support the rear of the ATV to insure that the hunter, or other person seated within the elevated chair is securely braced.

Thus, a broad object of the present invention is to provide a dependable and reliable ATV hunter stand device which is easily transportable.

A more basic object of the present invention is to provide an easily transportable ATV hunter's stand which may be quickly unfolded into an easily deployable position.

Another basic object of the present invention is to provide an ATV hunter stand of the character described which may be easily assembled and quickly deployed with a minimum expenditure of physical effort.

Yet another fundamental object of the present invention is to provide a dependable hunter stand of the character described which insures relative security and safety for the user.

Yet another object of the present invention is to provide a hunter stand of the character described which is readily adaptable for use with a variety of all terrain vehicles such as three wheelers, four wheelers and the like.

Another object is to provide a hunter stand of the character described which may be readily carried, easily deployed, and readily disassembled by a single individual possessing average strength and physial endurance.

A still further object of this invention is to provide a hunter stand of the character described which can be used at ground level as a camp chair.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 2:
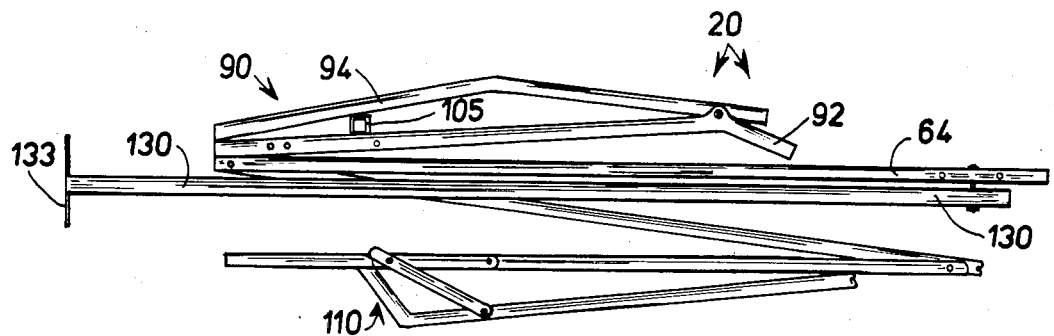
FIG. 2 is a side elevational view of.the stand disposed in a folded transportable position.
Figure 1:
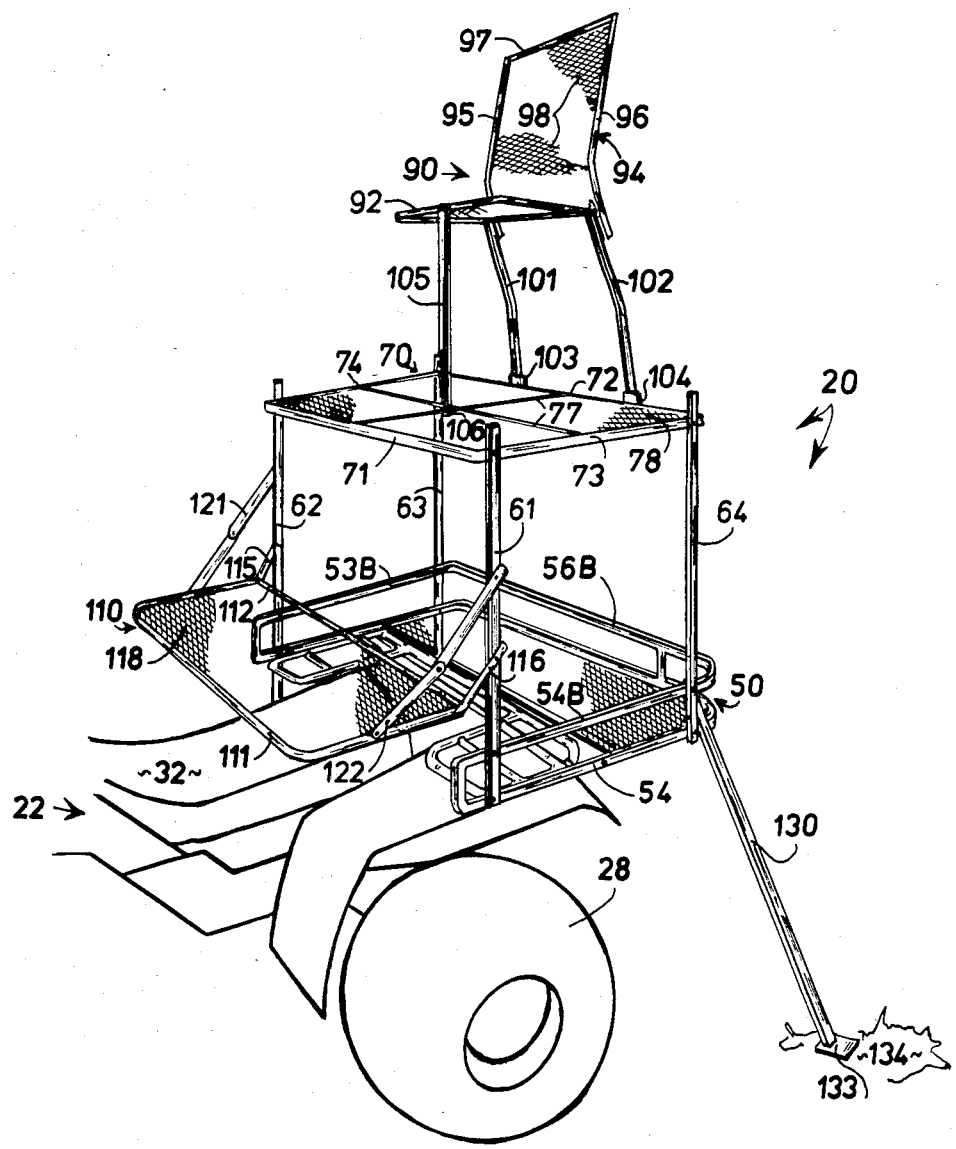
FIG. 1 is a fragmentary, pictorial view illustrating the best mode of my ATV HUNTING STAND shown int he deployed position upon a typical ATV.
Figure 4:
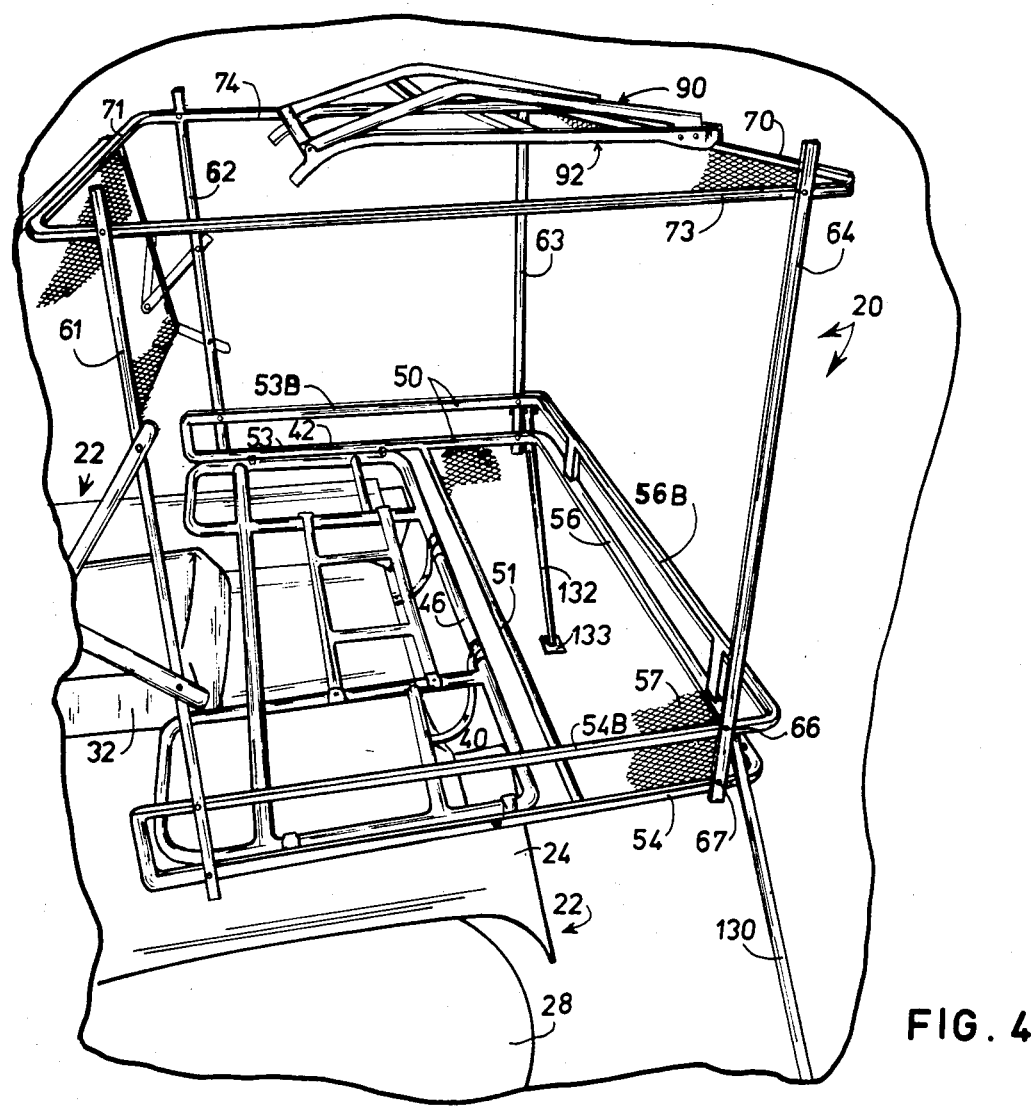
FIG. 4 is an enlarged, fragmentary, perspective view illustrating a semi-erected position adapted to be driven through the woods on an ATV preliminary to hunting.
Figure 6:
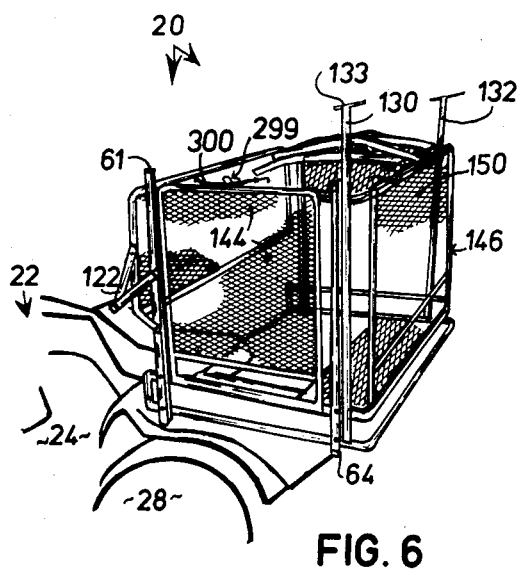
FIG. 6 is a fragmentary, pictorial view illustrating the stand deployed to form a cage.
Figure 7:
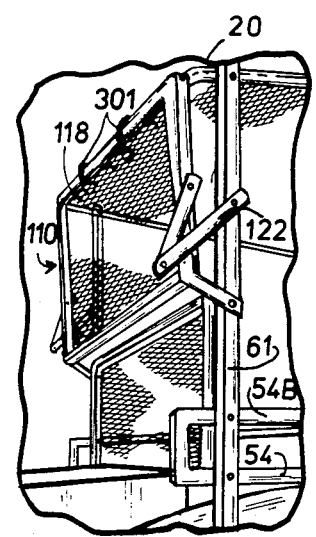
FIG. 7 is front fragmentary, perspective view illustrating the front foot rest deployed in a folded position; and, FIG. 8 is an enlarged scale, fragmentary, rear plan view, as viewed generally to the right of FIG. 6, and illustrating the rear plate deployed in a cage position and an optional resilient support means.

With reference now to the appended drawings, the preferred hunter stand constructed in accordance with the best mode of the present invention has been broadly designated by the reference numeral 20. Stand 20 may be deployed in either an operable position as shown in FIG. 1, a totally transportable, substantially folded and planar position as shown in FIG. 2, or it may be deployed in an intermediate position as illustrated in FIG. 4 wherein it is adapted to be driven through the woods on the way to a hunt. Moreover, the apparatus may be deployed as will hereinafter be described as shown in FIGS. 6 and 7 for providing an enclosure (FIG. 6) for temporarily storing a dog or the like.

The stand 20 is adapted to be employed in conjunction with a conventional all terrain vehicle such as the ATV 22. As will be appreciated from FIG. 5, a conventional four-wheeler ATV is there shown. This apparatus includes a chassis 24 supported and driven by front wheels 26, 27 and rear wheels 28. A conventional handle bar 30 is adapted to steer the apparatus, and the driver sits on seat 32 and drives the ATV 22 in a normal manner. It will be appreciated by those skilled in the art that ATV 22 may be a four-wheeler, a three-wheeler, or a motor cycle with a side car etc., as long as the apparatus of FIG. 3 is properly disposed.

Figure 3:
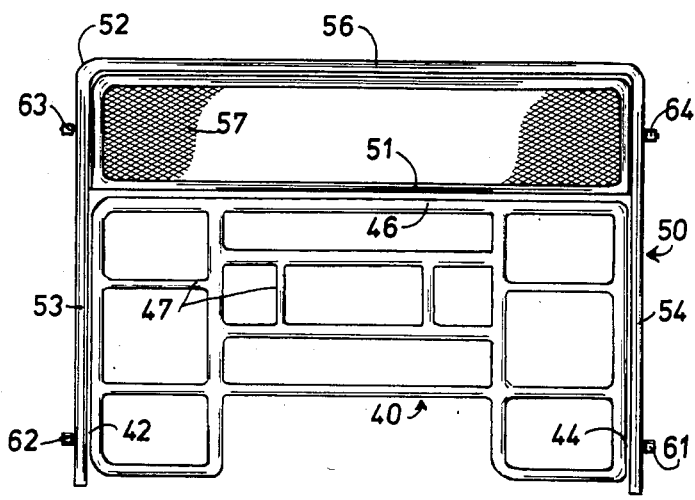
FIG. 3 is a fragmentary, sectional view illustrating the original equipment ATV rear deck and the preferred mounting rack employed to support the apparatus.

With reference to FIG. 3, the ATV 22 typically includes a generally rectangular rear deck generally indicated by the reference numeral 40. Deck 40 is mechanically associated with the rear carriage portion of the ATV, and in most cases is permanently secured thereto by welding or the like. It includes a pair of parallel spaced-apart lateral struts 42, 44, which are integral with a rear strut 46. A plurality of interior structural members 47, are also illustrated in FIG. 3. Importantly, this deck 40 provides a preferred base upon which the structure of stand 20 is thereafter mounted.

As best viewed in FIG. 3, the stand 20 includes a base, broadly designated by the reference numeral 50, which comprises a generally U-shaped integral frame member 52 comprising sides 53, 54 and a rear rail 56. An intermediate brace 51 disposed generally parallel with rear deck rails 56 and 56B extends between lower sides 53 and 54, and serves to secure steel webbing 57 which provides a supportive surface. As best viewed in FIG. 4, the frame member 52 includes both upper and lower levels. Thus this structure includes sides 53B and 54B which are respectively elevated above lower sides 53 and 54. Similarly, upper rear strut 56B is elevated above strut 56.

The sides of the rear deck 50 provide convenient mounting of a plurality of upwardly extending, rigid stanchions 61, 62, 63 and 64. Each of the stanchions is arrayed in generally rectangular alignment, each is disposed generally at the vertex of the rectangular base deck 50. In each case a pair of mounting screws such as bolts 66, 67 (FIG. 4) are employed. Stanchions 61 and 64 comprise a left (i.e. as viewed in FIG. 1) side of the stand 20, and stanchions 62 and 63 provide a right side thereof. Stanchion 63 and 64 form the rear of the stanchion assembly.

Preferably a generally planar, chair support plate, generally designated by the reference numeral 70 is operatively coupled to the stanchions in spaced-apart, generally parallel relationship relative to the rear deck 50. Support plate 70 comprises a front 71 and a rear 72 separated by a pair of spaced-apart integral sides 73, 74. A pair of internal braces 77 preferably held anchor the steel webbing 78 weldably associated with the plate 70 to provide a firm footing and to brace the elevated chair 90 upon which the hunter may sit.

With reference now directed to FIGS. 1, 2 and 4, the chair 90 comprises a generally rectangular, planar, seat portion 92 which is operatively pivotally associated with a rear back rest 94. Backrest 94 includes a pair of integral sides 95, 96 joined by a back brace 97 between which webbing 98 is disposed. Similarly, the seat portion 92 includes supportive steel webbing to provide a supportive seat. Seat 90 is associated with a pair of spaced-apart legs 101 and 102 pivotally disposed upon opposite sides of the seat portion 92 and received within suitable quick connect fittings 103 and 104 (FIG. 1) disposed upon chair support brace 72.

Additionally, a front stabilizer leg 105 is associated with the front of the chair so as to provide a stabilizing connection to the chair support plate 70. The stabilizer leg 105 is received through the plane of the steel webbing of the chair support plate 70, and it is releasably coupled within a tubular receptor 106.

Figure 5:
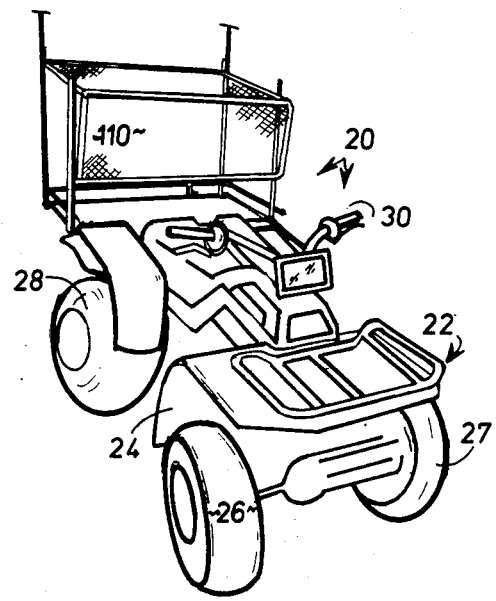
FIG. 5 is a fragmentary, pictorial view illustrating the front of an ATV and the rear mounted stand.

As best viewed in FIGS. 1, 5 and 7, a foot shelf, generally designated by the reference numeral 110 is foldably coupled to the front stanchion 61 and 62. The generally rectangular foot plate 110 comprises a front 111 integral with a spaced-apart, parallel rear 112 which extends between a pair of lateral braces 115, 116 pivotally coupled to vertical stanchion 62 and 61 respectively. Shelf 110 is further braced by twin segment folding braces 121 and 122 which are similarly operatively associated with stanchion 62 and 61. Support for the feet of the user is provided by steel webbing 118. Thus the foot shelf 110 may be folded between the deployed position illustrated in FIG. 1, to the position illustrated in FIGS. 6 and 7. In this instance the steel webbing 118 effectively blocks the enclosure such that an animal such as a hunting dog may be housed within the apparatus. Moreover, a pair of spaced-apart, conventional spring fasteners 301 (FIG. 7) maintain the foot plate 110 in the closed "cage" position.

In this embodiment a pair of optional side plates generally designated by the reference numeral 144 and 146 are coupled on opposite sides of the stand. Plate 144 is suspended relative to stanchion 61 and 64, and companion side plate 146 is suspended relative to stanchion 62 and 63. Similarly, a rear plate 150 comprising a frame 151 (FIG. 8) may be attached between rear stanchions 63 and 64 to provide the enclosure or cage rear wall. A resilient strap 300 (FIG. 6) is wound about the plate and terminates upon tab 299.

Figure 8:
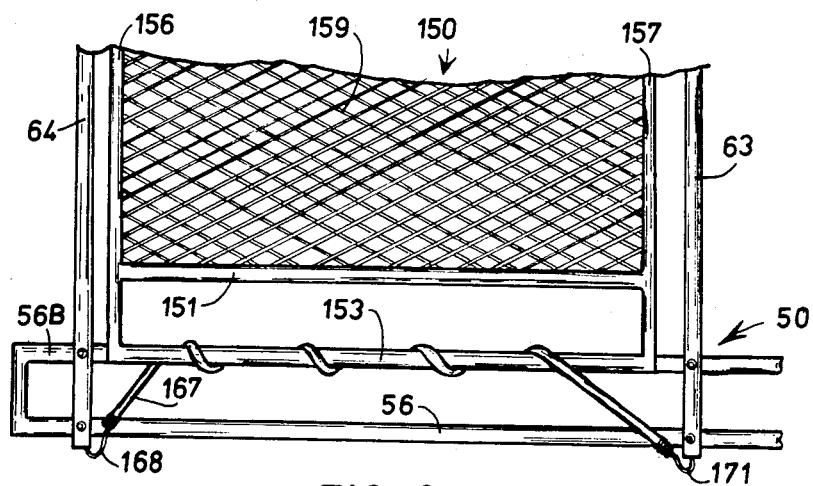

With reference now to FIG. 8, the rear plate 150 includes a lower pair of frame rails 151, 153 rigidly extending in generally parallel, spaced apart relationship between a pair of integral sides 156 and 157. Steel webbing 159 of generally planar, rectangular dimensions is weldably suspended between the back plate rails 156, 157 and 151 to provide a back. The lowermost rail 153 is secured to the rear deck rail 56B previously described. To this extend the resilient cord 167 is fastened at its first end 168 to the bottom of stanchion 64 rather and at its opposite end 171 to the bottom of stanchion 63. It is wound around rear deck rail 56B and the closely adjacent rear plate strut 153 to fasten same together.

In operation the apparatus may be moved about relative to the ATV and stored separately, where required, and disposed in the position illustrated in FIG. 2. It will be noted that the lower foot support plate 110 is adapted to be suspended somewhat lower than the support feet 130. A pair of rear support pedestals or feet 130 132,(FIGS. 1 and 4) extend downwardly from the stanchions 64 and 63 respectively and terminate in a support plate 133 which contacts ground 134 to support the rear of the ATV/stand assembly to insure that the hunter, or other person seated within chair 90 is securely braced.

The deck 50 is to be mounted first and this may be semipermanently left on the apparatus. Once deck 50 is established or mounted as shown, the stanchion members 61 through 64 may be attached as previously discussed, and the apparatus is erected with simple hand tools as in FIG. 4. The upper chair assembly 90 as well as the foot reat asembly 110 may be deployed in an out-of-the-way configuration as illustrated in FIG. 4 whereby to provide the lowest possible ground clearance for transportation of the apparatus through the woods to the hunting site, for example. Preferably when the hunter arrives at the site the chair 90 is erected as shown by folding it rearwardly such that legs 101 and 102 come up and are fitted into elements 103, 104 whereupon stanchion leg 105 is deployed forward and fitted into receptacle 106 as indicated earlier. Whereupon footrest 110 may be lowered as shown.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable, foldable, hunter stand adapted to be retrofitted to all terrain vehicles (ATV's) such as three-wheelers, four-wheelers, or the like; said stand comprising:

a plurality of support stanchions coupled to a conventional rear deck associated with said ATV ; said support stanchions user foldable between generally horizontal and vertical positions relative to said ATV;

a chair support plate operatively foldably coupled to the front ones of said stanchions and adapted to be semi-permanently elevated thereby in generally horizontal, parallel spaced apart relation with respect to said rear deck; said support plate including a plurality of quick connect fittings; and, a chair deployable in either generally flat transportation position or a vertically elevated operational position, said chair foldably coupled to said chair support plate and said chair comprising a seat portion, a back rest foldably coupled to said seat portion, a pair of seat support struts foldably coupled to said seat and adapted to quickly connect to said quick connect fittings, and a front stabilizer leg adapted to be selectively coupled to said support plate and adapted to firmly secure said seat portion above said seat support plate.

2. The stand as defined in claim 1 wherein said support stanchions pivotally receive a foldable foot shelf adapted to be selectively deployed in either a generally horizontal position spaced apart from, below and parallel to said chair support plate, or a generally vertical position leaning against two front ones of said support stanchions.

3. The stand as defined in claim 2 including a pair of support pedestals pivotally associated with the rear ones of said stanchions and adapted to be pivoted rearwardly into ground engaging contact for bracing and supporting siad stand.

4. The stand as defined in claim 3 wherein said ATV rear deck is generally rectangular, said stanchions are disposed at the four corners of said rear deck, and said stand comprises a pair of side plates adapted to be removably coupled to side stanchions, and a rear plate adapted to be attached to and between the rearmost stanchions, whereby an enclosure is defined between said chair support plate, said ATV rear deck, and said foot shelf when said foot shelf is disposed in said generally vertical position.

5. The stand as defined in claim 1 wherein said stand comprises a base adapted to be coupled to said rear deck in substantially parallel, surrounding relation relative thereto.

6. A portable, foldable, observation stand adapted to be retrofitted to all terrain vehicles (ATV's) such as three-wheelers. four-wheelers, or the like, said stand comprising:

support stanchion means for providing a frame for said stand, said stanchion means coupled to a conventional generally rectangular rear deck associated with said ATV, and said support stanchion means user foldable between generally horizontal and vertical positions relative to said ATV and generally deployed at the four corner of said deck;

foot shelf means adapted to be seletively foldably deployed in either a generally horizontal position spaced apart from, below and parallel to said chair support plate means for supporting a users feet, or a generally vertical position leaning against two front ones of said support stanchions for blocking the front ones of said stanchion means to help form a cage;

support pedestal means pivotally associated with said stand and adapted to be pivoted rearwardly into ground engaging contact for bracing and supporting said stand;

chair support plate means operatively foldably coupled to the front ones of said stanchion means and adapted to be semipermanently elevated thereby in generally horizontal, parallel spaced apart relation with respect to said rear deck; said support plate means including a plurality of quick connect fittings; and, chair means deployable in either generally flat transportation position or a verticlaly elevated operational position for supporting and seating a hunter or other user, said chair means foldably coupled to said support plate means and comprising a seat portion, a back rest foldably coupled to said seat portion, a pair of seat support struts foldably coupled to said seat and adapted to quickly connect to said quick connect fittings, and a front stabilizer leg adapted to be selectively coupled to said support plate for firmly securing said seat portion above said seat support plate.

7. The stand as defined in claim 6 wherein said ATV rear deck is generally rectangular, said stanchions are disposed at the four corners of said rear deck, and said stand comprises a pair of side plates adapted to be removably coupled to sides of said stanchion means, and a rear plate adapted to be attached to and between the rear of said stanchion means, whereby an enclosure is defined between said chair support plate, said ATV rear deck, and said foot shelf when said foot shelf is disposed in said generally vertical position.

8. The stand as defined in claim 7 wherein said stand comprises a base adapted to be coupled to said rear deck in substantially parallel, surrounding relation relative thereto.

* * * * *